(12) United States Patent  
Lovitt

(10) Patent No.: US 7,040,993 B1  
(45) Date of Patent: May 9, 2006

(54) AMUSEMENT DEVICE WITH CONCEALED IMAGES

(76) Inventor: Bert Lovitt, 637 Haverford Ave., Pacific Palisades, CA (US) 90272

( * ) Notice: Subject to any disclaimer, the term of this patent is extended or adjusted under 35 U.S.C. 154(b) by 0 days.

(21) Appl. No.: 10/837,341

(22) Filed: Apr. 30, 2004

(51) Int. Cl.  
*A63J 5/02* (2006.01)

(52) U.S. Cl. .......................................... 472/61; 472/72

(58) Field of Classification Search ............ 472/61–64, 472/70–74; 283/117, 901, 72, 73, 91; 281/51, 281/15.1, 38  
See application file for complete search history.

(56) References Cited

U.S. PATENT DOCUMENTS

| | | | | |
|---|---|---|---|---|
| 1,219,731 A | * | 3/1917 | Hall ............................ 40/443 |
| 1,881,417 A | * | 10/1932 | Hodgkin ..................... 40/443 |
| 1,981,923 A | * | 11/1934 | Miller ......................... 40/438 |
| 3,278,182 A | * | 10/1966 | Lescher ....................... 472/72 |
| 4,072,314 A | * | 2/1978 | Rosen et al. ................ 273/161 |
| 5,574,519 A | * | 11/1996 | Manico et al. .............. 396/429 |
| 5,574,621 A | * | 11/1996 | Sakamoto et al. ........ 361/321.1 |
| 6,112,437 A | | 9/2000 | Lovitt |
| 6,135,599 A | * | 10/2000 | Fang ............................ 353/98 |
| 6,375,078 B1 | * | 4/2002 | Russell et al. ......... 235/472.01 |
| 6,443,590 B1 | | 9/2002 | Lovitt |
| 2004/0062038 A1 | * | 4/2004 | Donovan ..................... 362/184 |

* cited by examiner

*Primary Examiner*—Kien Nguyen  
(74) *Attorney, Agent, or Firm*—Blakely, Sokoloff, Taylor & Zafman

(57) ABSTRACT

A children's amusement device has a translucent sheet with hidden images that may be revealed when illuminated from behind. The sheet is laminated with an image disposed on an interior surface of the sheet. The image is substantially hidden from view in ambient lighting. However, the image is revealed when illuminated from behind the sheet.

9 Claims, 3 Drawing Sheets

AMUSEMENT DEVICE WITH CONCEALED IMAGES

BACKGROUND OF THE INVENTION

1. Field of the Invention

The present invention relates generally to the field of amusement and educational devices for children. More particularly, the invention relates to a device in which concealed images, such as within the pages of a book, are revealed by illumination from behind.

2. Background

Many children's books are designed to entice young readers with amusement features. For example, children's books may include sound effects and/or "pop-up" illustrations. These types of features contribute to a more enjoyable reading experience and can also enhance the educational value of a book.

My prior U.S. Pat. Nos. 6,112,437 and 6,443,590 disclose various articles with illuminated animated displays. In these articles, the light sources are fixed in relation to the images such that a plurality of animated sequences would require a corresponding plurality of light sources. It would be desirable to have a separate light source for illuminating any one of a plurality of animated sequences.

SUMMARY OF THE INVENTION

One embodiment of the present invention provides a children's amusement device in the form of a book with hidden images that may be revealed with a "magic wand". One or more of the pages of the book are constructed as a translucent laminated sheet with an image disposed on an interior surface of the page. The image is substantially hidden from view in ambient lighting. However, the image is revealed when illuminated from behind the page. The "magic wand" comprises a source of illumination that is held behind the page and is activated with a finger-operated switch. A plurality of related images may be juxtaposed and illuminated sequentially to display an animated sequence, such as a figure running or jumping. In this case, the "magic wand" has a plurality of light sources that align with the plurality of images and that are sequentially activated. The "magic wand" may also include a sound generator to provide sound effects for the illuminated images.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
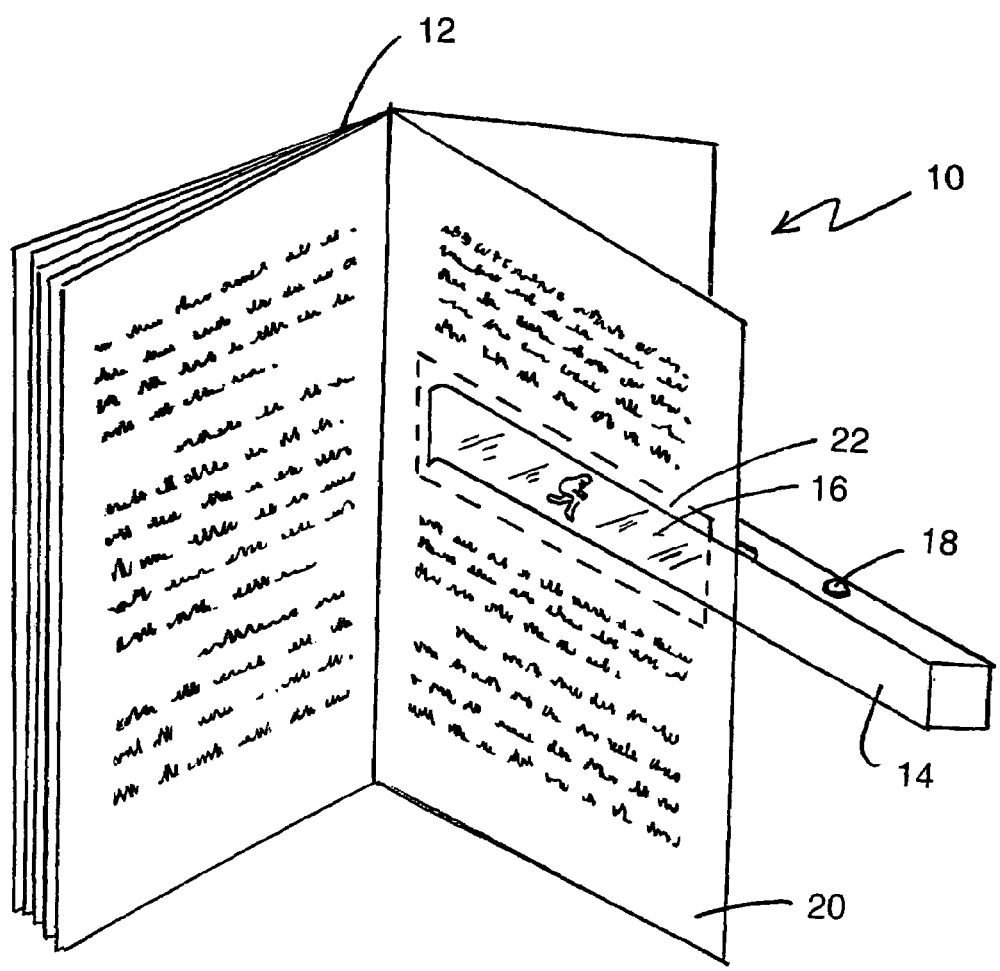
FIG. 1 is a perspective view of an amusement device constructed in accordance with one embodiment of the present invention.

FIG. 1 shows an amusement device 10 in accordance with one embodiment of the present invention. The device comprises a book 12 in combination with a wand 14. Book 12 has a plurality of pages 20, some or all of which may include an image area 22. A plurality of images are contained within image area 22, but are obscured from view as more fully described below. To view the images within image area 22, wand 14 is placed behind page 20. Wand 14 may include a transparent guide 16 that is slid over the front surface of page 20 so that the page is positioned between the guide and the body of the wand. Indexing marks may be placed on page 20 to assist the user in properly positioning wand 14. Wand 14 includes a finger-operated switch 18 to actuate a source of illumination within the wand, thereby revealing one or more of the hidden images.

Figure 2:
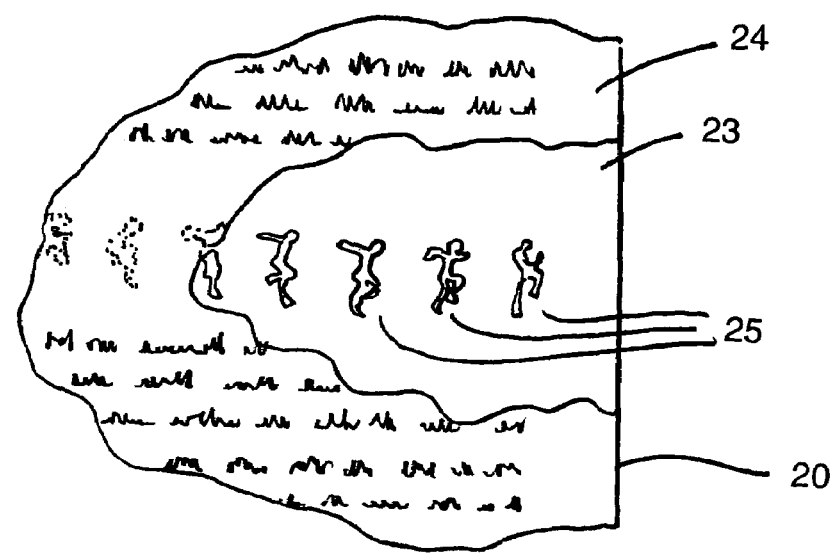
FIG. 2 is a detailed view of a page from the amusement device shown in FIG. 1.

FIG. 2 presents a detailed and partially cut-away view of page 20. In one embodiment, page 20 comprises a first layer 23 and a second layer 24. A plurality of images 25 are printed on layer 23 within image area 22. The images 25 may comprise individual "frames" of an animated sequence, such as "stop-action" images of a figure running or jumping. Layer 24 covers layer 23, including images 25. Both layers 23 and 24 are translucent, such that light is transmitted but is partially diffused. Thus, images 25 are obscured in ambient lighting, but illumination from behind layer 23 will reveal one or more of the images 25 through the overlying layer 24. Layer 24 may be printed with text and/or graphics except within image area 22. Furthermore, the reverse side of layer 23 may also be printed with text and/or graphics. Because light is diffused as it passes through layers 23 and 24, printing on the reverse side of layer 23 may be placed within image area 22 without disturbing the display of images 25.

Page 20 may be constructed in other ways. For example, layer 23 may be printed with images as described above and then coated with a translucent material. The material may be applied to the entire page, which may then be printed outside of the image area, or the material may be applied only within the image area. In another variation, page 20 may comprise three layers, an inner layer printed with images and two outer layers on each side of the image layer.

Figure 3:
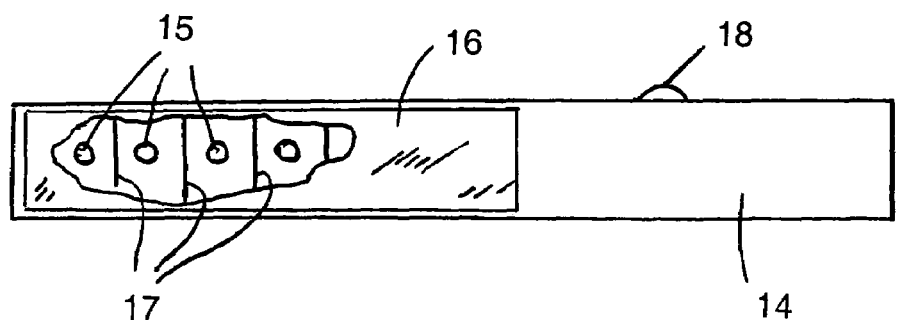
FIG. 3 is a partially cut-away view of the wand shown in FIG. 1.

FIG. 3 is a partially cut-away view of the wand 14. A plurality of illumination sources 15 are disposed within the wand, along with a suitable power source (not shown). The illumination sources may comprise light emitting diodes (LEDs), although incandescent bulbs, electroluminescent panels or other suitable sources of illumination may be used. The sources of illumination are separated from one another, such as by partitions 17 within the body of reader 14. Thus, each of the sources of illumination will reveal only its corresponding image.

Figure 4:
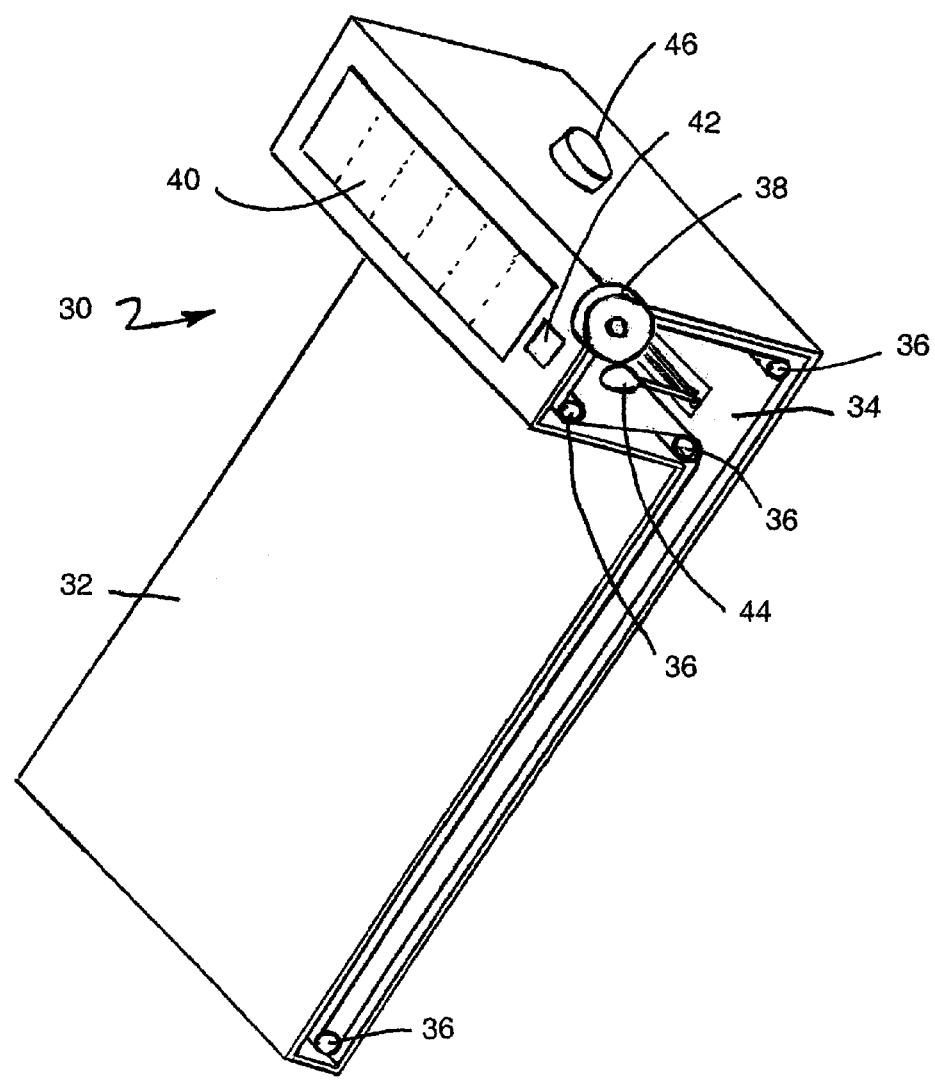
FIG. 4 is a perspective view of an amusement device constructed in accordance with a second embodiment of the present invention.

FIG. 4 shows an amusement device 30 in accordance with a second embodiment of the present invention. Device 30 has a housing 32, the side wall of which has been omitted in the drawing to reveal the internal construction. An endless belt 34 is disposed within housing 32 on rollers 36. One of the rollers is connected to a knob 38 so that the belt may be rotated into a desired position. Belt 34 carries a plurality of image sequences. The belt is rotated by means of knob 38 until a desired image sequence is aligned with display window 40. Registration indicia may be provided on belt 34 and viewable through window 42 to assist in properly aligning the image sequence.

An array of light sources 44 are disposed within housing 32 to illuminate the images from behind. As in the previously described embodiment, a separate light source is provided for each of the images in the sequence. A finger-operated switch 46 actuates the light sources to sequentially illuminate the corresponding images. As previously described, the images are concealed from view in ambient lighting. Belt 34 may have a laminated construction, as in the previously described embodiment, or the display window may be translucent so as to conceal the images.

Housing 32 may be constructed so that it may be conveniently held behind a book as it is being read. Means may be provided for attaching housing 32 to the cover of a book. The text and/or images in the book may have associated indicia to specify a related sequence of images on belt 34. When the reader encounters such indicia, knob 38 is rotated until the same indicia is displayed in window 42. Such indicia may comprise letters, numbers, symbols or a combination thereof.

Device 30 may be constructed to utilize image carriers other than belt 34. For example, images may be printed on a sheet or carried by a card that is moved within housing 32 to align a desired image sequence with display window 40.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An amusement device comprising:
   an illumination device having a plurality of light sources and a control to activate the light sources;
   a translucent laminated sheet having a plurality of images disposed on an interior surface of the sheet such that the images are substantially hidden from view in ambient lighting and wherein the plurality of images are arranged in registration with respective ones of the plurality of light sources;
   whereby, when the light source is positioned behind the images and the control is actuated, the plurality of light sources are activated sequentially following actuation of the control and the images are revealed;
   wherein the illumination device comprises a linear array of light sources.

2. The amusement device of claim 1 wherein a first outer surface of the sheet is printed in areas that do not overlay the images.

3. The amusement device of claim 2 wherein a second outer surface of the sheet is printed in areas that overlay the images.

4. The amusement device of claim 1 wherein the sheet comprises a page of a book.

5. The amusement device of claim 1 wherein the plurality of images comprise sequential images of an animated sequence.

6. The amusement device of claim 1 further comprising a sound generator.

7. The amusement device of claim 6 wherein the sound generator is disposed in the illumination device.

8. The amusement device of claim 6 wherein the sound generator generates a plurality of sounds.

9. The amusement device of claim 8 wherein the sound generator generates one of the plurality of sounds and said one of the plurality of sounds is thematically related to the image.

\* \* \* \* \*